United States Patent
Schraff et al.

(10) Patent No.: US 11,534,849 B2
(45) Date of Patent: Dec. 27, 2022

(54) LIGHT WEIGHT CORDLESS STUD WELDER

(71) Applicant: Nelson Stud Welding, Inc., Elyria, OH (US)

(72) Inventors: Scott J. Schraff, Avon, OH (US); Larry L. Church, Jefferson, OH (US); Stephen D. Brooks, Valley City, OH (US); Jeffrey Krupp, Vermillion, OH (US)

(73) Assignee: NELSON STUD WELDING, INC., Elyria, OH (US)

(*) Notice: Subject to any disclaimer, the term of this patent is extended or adjusted under 35 U.S.C. 154(b) by 238 days.

(21) Appl. No.: 17/123,532

(22) Filed: Dec. 16, 2020

(65) Prior Publication Data

US 2021/0129255 A1 May 6, 2021

Related U.S. Application Data

(63) Continuation of application No. 15/241,405, filed on Aug. 19, 2016, now Pat. No. 10,894,296.

(60) Provisional application No. 62/207,544, filed on Aug. 20, 2015.

(51) Int. Cl.
*B23K 9/20* (2006.01)
*B23K 11/00* (2006.01)
(Continued)

(52) U.S. Cl.
CPC ............ *B23K 9/202* (2013.01); *B23K 9/1006* (2013.01); *B23K 11/0053* (2013.01); *B23K 11/26* (2013.01); *B23K 11/28* (2013.01); *H01M 10/0525* (2013.01); *H01M 50/20* (2021.01); *H02J 7/00* (2013.01); *H01M 2220/30* (2013.01)

(58) Field of Classification Search
CPC .. B23K 9/202; B23K 9/1006; B23K 11/0053; B23K 11/26; B23K 11/28; B23K 9/095;
(Continued)

(56) References Cited

U.S. PATENT DOCUMENTS 4,182,949 A 1/1980 Powers et al.
6,225,596 B1 5/2001 Chandler et al.
(Continued)

FOREIGN PATENT DOCUMENTS

| CN | 101743087 A | 6/2010 |
|---|---|---|
| DE | 102013014666 A1 | 12/2014 |
| WO | 2014080757 A1 | 5/2014 |

OTHER PUBLICATIONS

International Search Report in corresponding PCT/US2016/047981, dated Feb. 27, 2017.
Breakthrough into a new dimensional HBS Stud Welding, Nov. 28, 2014 (last visited Mar. 10, 2017) http://www.hbs-studwelding.com/nc/news/details/article/breakthrough-into-a-new-dimensional-66.html.
"Keywords to understanding Sony Energy Devices"; Retrieved Jun. 12, 2017 from https://web.archive.org/web/20150711141913/http://www.sonyenergy-devices.co.jp/en/keyword/; Archived Jul. 11, 2015.

*Primary Examiner* — Brian W Jennison
(74) *Attorney, Agent, or Firm* — Dickinson Wright PLLC (57) ABSTRACT

A portable stud welder apparatus is provided for welding a stud onto a work piece. The portable stud welder apparatus includes a housing and an energy storage device. A weld stud gun that is configured to hold a weld stud is electrically connected to the energy storage device for receiving energy from the energy storage device to pass a current through the stud and the work piece to form a weldment. At least one battery of the lithium ion type that is removeably coupled to the housing to establish an electrical connection with said energy storage device and provide energy to the energy storage device.

13 Claims, 6 Drawing Sheets

(51) Int. Cl.
*B23K 11/28* (2006.01)
*B23K 11/26* (2006.01)
*H02J 7/00* (2006.01)
*H01M 50/20* (2021.01)
*B23K 9/10* (2006.01)
*H01M 10/0525* (2010.01)

(58) Field of Classification Search
CPC ......... B23K 9/10; B23K 9/133; H01M 50/20; H01M 10/0525; H01M 2220/30
See application file for complete search history.

(56) References Cited

U.S. PATENT DOCUMENTS

| | | |
|---|---|---|
| 6,396,019 B1 | 5/2002 | Williams |
| 6,747,246 B2 | 6/2004 | Crandell, III |
| 6,923,352 B2 | 8/2005 | Oh |
| 2005/0258155 A1 | 11/2005 | DeYoung |
| 2006/0219674 A1 | 10/2006 | Picard et al. |
| 2007/0257084 A1 | 11/2007 | Carrier et al. |
| 2008/0053967 A1 | 3/2008 | Moore |
| 2008/0061040 A1 | 3/2008 | Sanders et al. |
| 2008/0272739 A1 | 11/2008 | Carrier et al. |
| 2009/0057285 A1 | 3/2009 | Bashore et al. |
| 2012/0152910 A1 | 6/2012 | Gitter et al. |
| 2013/0062327 A1 | 3/2013 | Hsu et al. |
| 2013/0126498 A1 | 5/2013 | Hsu et al. |
| 2015/0021305 A1 | 1/2015 | Rozmarynowski et al. |
| 2015/0068783 A1 | 3/2015 | Pickett et al. |
| 2015/0328711 A1 | 11/2015 | Miyahara |

LIGHT WEIGHT CORDLESS STUD WELDER

CROSS REFERENCE TO RELATED APPLICATION

The present application is a continuation of U.S. patent application Ser. No. 15/241,405 filed on Aug. 19, 2016 and entitled a "Light Weight Cordless Stud Welder", which claims priority to U.S. Provisional Patent Application Ser. No. 62/207,544, filed on Aug. 20, 2015, the entire disclosures of which are hereby incorporated by reference as though set forth fully herein.

BACKGROUND OF THE INVENTION

1. Field of the Invention

The present invention relates to a stud welder, and more particularly to a battery-powered, portable stud welder.

2. Description of the Prior Art

Stud welding is a technique for welding a fastener, such as stud or other fastener, to a base metal of a work piece. Various stud welder systems are known in the art for this purpose. One such type of stud welder system is known as a capacitive discharge (CD) system, which typically includes a charging circuit, an energy storage device, e.g., one or more capacitors, and a discharge circuit which extends through a weld stud gun. The power supply for such welding systems is normally an external source of AC power. In operation, the energy storage device is discharged to create an arc between a stud that is connected to the weld stud gun and the work piece, thereby heating up the stud and the work piece. When the arc is complete, the weld stud gun plunges the stud into the heated area on the work piece to create a weldment. Examples of such systems are provided in U.S. Patent Application Publication Nos. US 2013/0126498 to Hsu et al. and US 2013/0062327 to Hsu et al. However, the stud welder systems disclosed in US 2013/0126498 and US 2013/0062327 each must be tethered to an external power supply during operation, and thus are not portable.

While other stud welder systems are battery-powered to improve on the portability of stud welder systems, each of these portable systems rely on multiple lead acid batteries, resulting in a relatively large and heavy welding system. Put another way, even if portable, the use of lead acid batteries causes the portable stud welder system to be difficult to transport and operate, especially when support by a user is required during welding. For example, U.S. Patent Application Publication No. 2008/0053967 discloses such a portable drawn arc stud welder that incorporates lead acid batteries as an internal power source. More specifically, the portable drawn arc stud welder requires four (4) 12 volt DC lead acid batteries that are each permanently disposed within the housing to provide the high capacity needed for stud welding. Since the lead acid batteries create a substantial heat load during operation, a thermal management system is also required which necessarily increases the weight and size of the resultant portable system. Finally, since the lead acid batteries are permanently secured within the housing, the portable stud welder must also include an internal battery charger that further adds weight and size to the footprint of the portable system, as well as the requirement for the portable system to be plugged into an outlet to undergo charging. The downtime incurred during charging of the portable stud welder system can lead to lost operational time of the portable stud welder system.

In view of the foregoing, there remains a need for improvements to such portable stud welder systems.

SUMMARY OF THE INVENTION

A portable stud welder apparatus is provided for welding a stud onto a work piece. The portable stud welder apparatus includes a housing and an energy storage device that is disposed in the housing. A weld stud gun that is configured to hold a weld stud is electrically connected to the energy storage device for receiving energy from the energy storage device to pass a current through the stud and the work piece to form a weldment. At least one battery of the lithium ion type is removeably coupled to the housing to establish an electrical connection with said energy storage device and provide energy to the energy storage device.

The invention in its broadest aspect therefore provides a cordless, portable stud welder apparatus that can be easily transported and operated, even while being manually carried and supported by an operator. More specifically, the use of a lithium ion battery provides a light weight, compact design which does not require a bulky thermal management system to keep the apparatus cool, nor does it require an integral power cord to operate or re-charge. Furthermore, the portable stud welder apparatus may advantageously be used even while a battery is charging since the lithium ion battery is quickly and easily disconnected from the housing and replaced with another battery.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENTS

Capacitive discharge (CD) welders have historically been powered from AC power outlets, typically 115 VAC/60 Hz in the United States, or 220 VAC/50 Hz in Western Europe. Specifically, CD welders require substantial charging current to charge the capacitor bank rapidly between welds. Because of this requirement, traditional CD welders typically require 10-20 amp capacity from a 115 VAC line, or 5-10 amp capacity from a 220 VAC line. This requirement is met by having a high capacity line cord for power, usually a 16 AWG to 14 AWG, 3-conductor cord. This cord, when extended to allow the welder to be used at a distance from the power outlet, adds substantial weight, restricted movement, safety concerns (shock/tripping/arc flash) and limited portability to the CD welder. The portable stud welder apparatus 20 as disclosed herein eliminates the need for the line cord, while also preserving the benefit of being a very light weight, portable stud welder.

Figure 11:
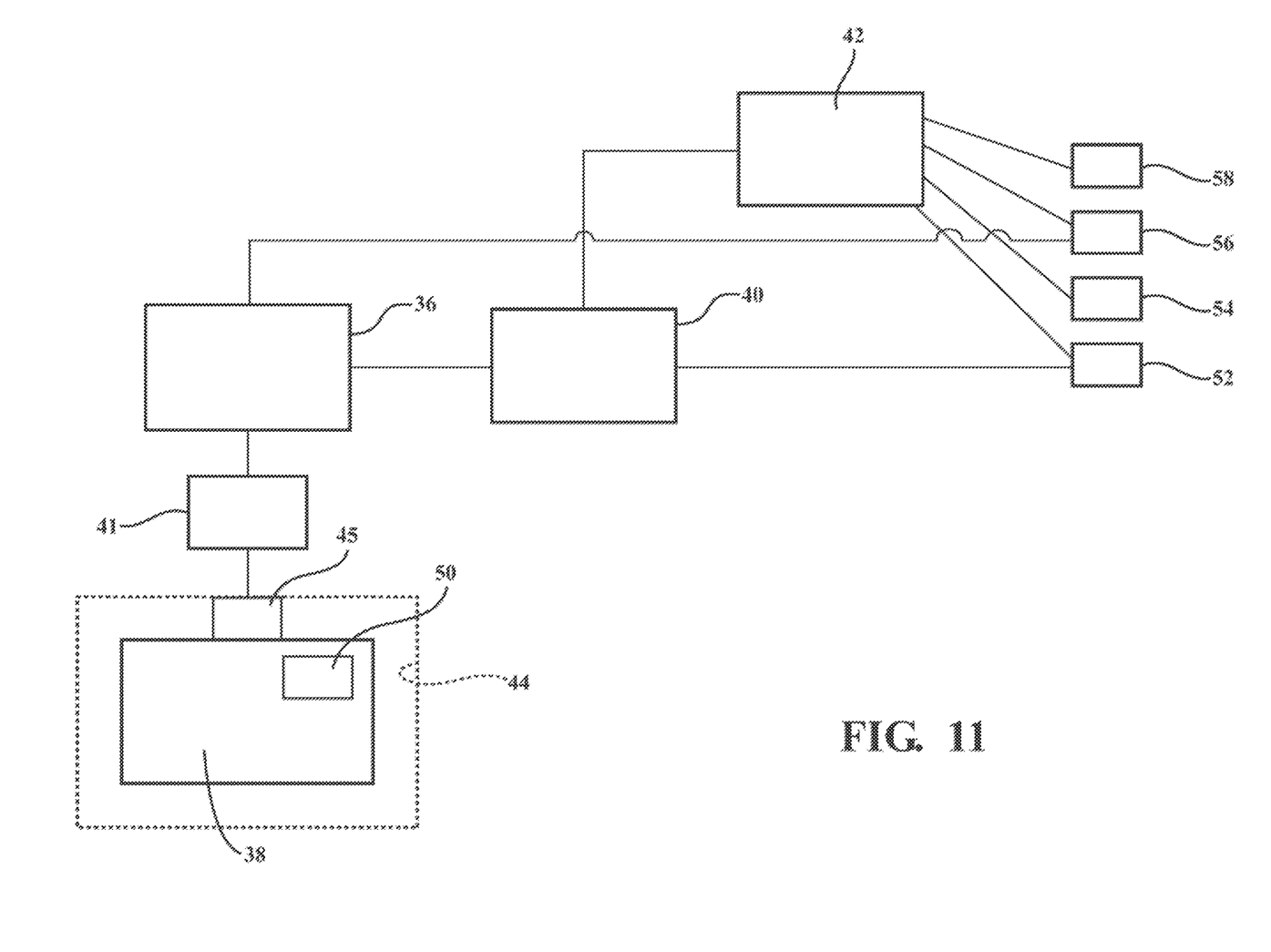
FIG. 11 is a schematic view of a battery recess, a battery, a battery control module, an energy storage device, a discharge unit, a controller, a boost converter, a gun welding terminal, a gun control terminal, a work piece ground terminal, and a chassis ground terminal.

Referring to the Figures, wherein like numerals indicate corresponding parts throughout the several views, the portable stud welder apparatus 20 is generally shown for welding a stud onto a work piece. The portable stud welder apparatus 20 includes a housing 22 that generally has a cuboid shape and includes a front wall 24, a back wall 26, a top wall 28, a bottom wall 30, a first side wall 32 and a second side wall 34. As best illustrated in FIGS. 3 and 11, an energy storage device 36, e.g., a capacitor 36, a discharge circuit 40, and a controller 42 are disposed in the housing 22.

Figure 3:
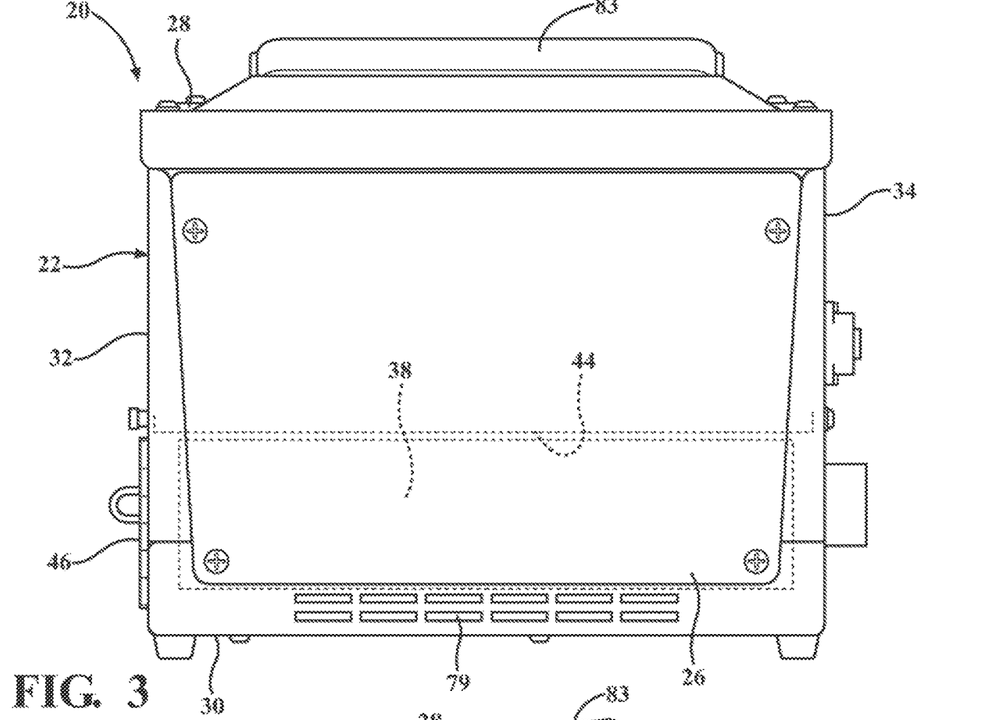
FIG. 3 is a back view of a housing of a portable stud welder apparatus, schematically illustrating a battery recess and battery disposed therein.
Figure 4:
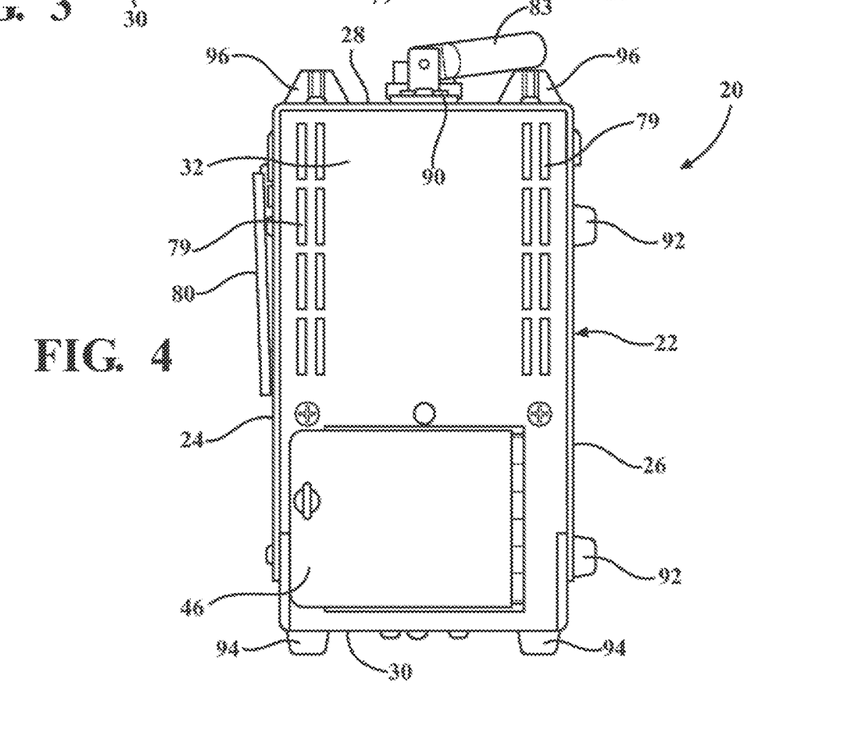
FIG. 4 is first side view of the portable stud welder.
Figure 8:
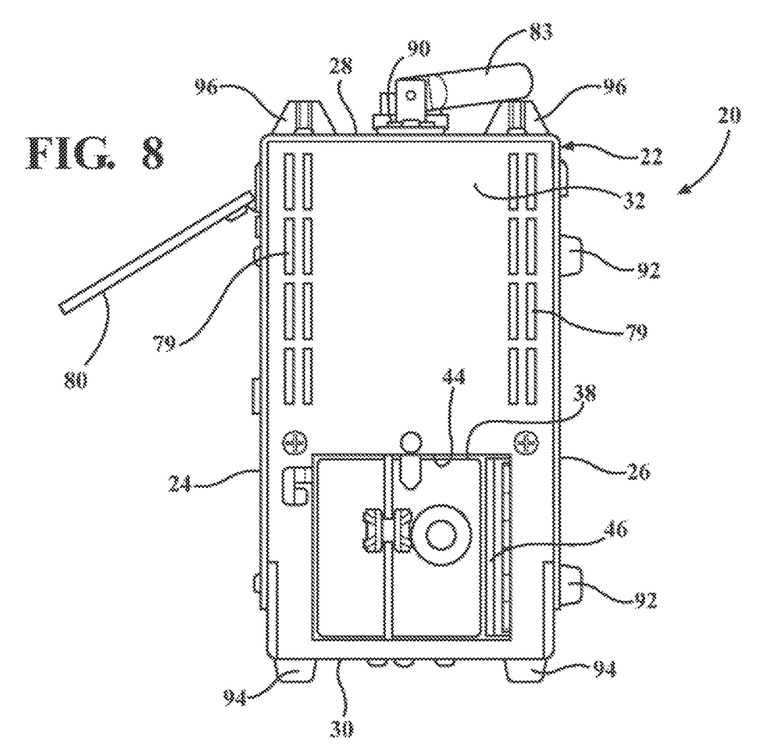
FIG. 8 is a first side view of the portable stud welder, illustrating a door disposed in an open position to provide access to a battery recess and a support assembly disposed in an unfolded position.

As illustrated in FIGS. 3, 4 and 8, a battery recess 44 is defined by the first side wall 32 of the housing 22. A battery terminal 45 is disposed in the battery recess 44 and is in electrical communication with the boost convertor 41, discharge circuit 40 and controller 42. A lithium ion battery 38 is removeably disposed in the battery recess 44 and electrically connected with the boost convertor 41 by way of battery terminal 45. The battery 38 may be a 40 volt DC battery, formed from, for example, a 46.8 volt DC, 5 amp-hour lithium ion battery 38. The battery 38 feeds a boost converter 41 to charge the energy storage device 36. It should be appreciated that lithium ion batteries of other voltages may be employed, and other circuits may be utilized to boost the voltage. However, the battery 38 is selected in order to provide an optimum combination of high amp-hours for long battery life and minimum overall weight and size. By utilizing a 46.8 volt DC, 5 amp-hour lithium ion battery 38 as described, the subject portable stud welder apparatus 20 is capable of delivering approximately 2000 welds on a single battery charge, while still providing a compact, lightweight package. In fact, given the light weight of the stud welder apparatus 20 (approximately 18 lbs. without cables 62, 64, 68, 69 and a stud welder gun 60 attached), the subject stud welder apparatus 20 provides approximately 111 welds per pound on a single battery charge. This is substantially improved over known prior art portable stud welders which utilize lead acid batteries. Furthermore, it should be appreciated that by using such a battery 38, a power cord is not necessary, thus allowing the stud welder apparatus 20 to be used just about anywhere, even in areas which lack immediate access to a power outlet. Elimination of a power cord also provides a reduced risk of electric shock, arc flash injury, or tripping over the power cord while working.

Figure 10:
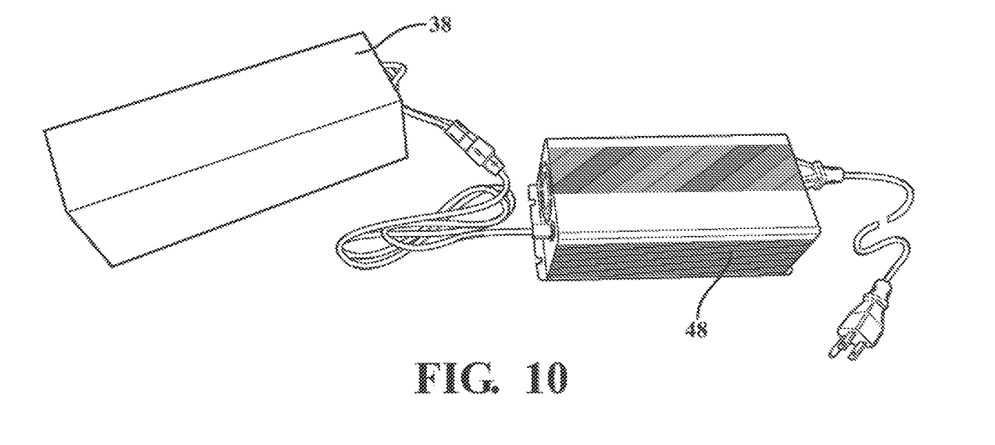
FIG. 10 is a perspective view of a battery charger illustrating a battery connected thereto.

With continued reference to FIGS. 3, 4 and 8, a door 46 is connected to the first side wall 32 of the housing 22 and is moveable between an open position and a closed position. The door 46 seals or encloses the battery 38 in the battery recess 44 when in the closed position, thus entirely sealing or covering and enclosing the battery 38 in the housing 22. On the other hand, when the door 46 is in the open position, the battery 38 is easily removeable from the battery recess 44. This allows the operator fast access to remove and replace the battery 38 with no tools required. As best illustrated in FIG. 10, when the battery 38 is removed from the battery recess 44, the battery 38 may be connected to a battery charger 48 that operates separate from and is disconnected from the housing 22 for charging the battery 38. This allows an operator to charge a second battery while welding with a first battery in use, and then later swap the batteries as needed. Put another way, the stud welder apparatus 20 is not limited to the constraints of an integral power cord for continued operation and re-charging. The battery charger may be connected to various power sources including, but not limited to, a 120V household mains power source. Because the battery 38 must be safe to handle while outside of the stud welder apparatus 20, it has an internal battery management system 50 (schematically shown in FIG. 3) which provides short circuit protection for the battery 38. The battery management system 50 also prevents overcharging the cells in the battery 38, disables discharge of the battery 38 upon reaching a low threshold output voltage in order to prevent damage to cells of the battery 38, and also disables discharge upon reaching a high temperature limit.

Figure 1:
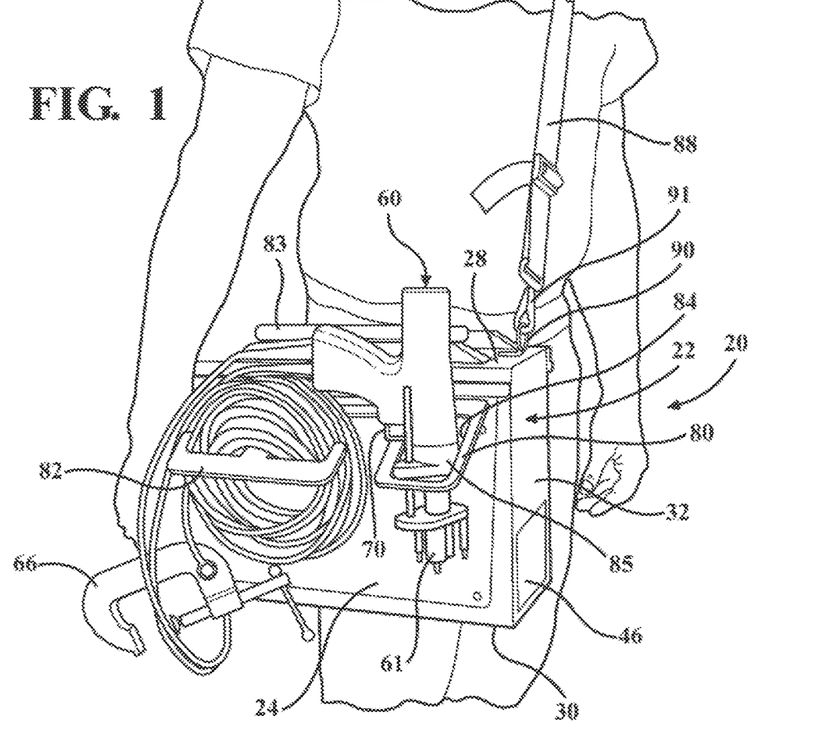
FIG. 1 is a perspective side view of a portable stud welder according to an aspect of the disclosure, illustrating a shoulder strap interconnected to a housing for allowing the portable stud welder apparatus to be easily carried and supported by a user.
Figure 2:
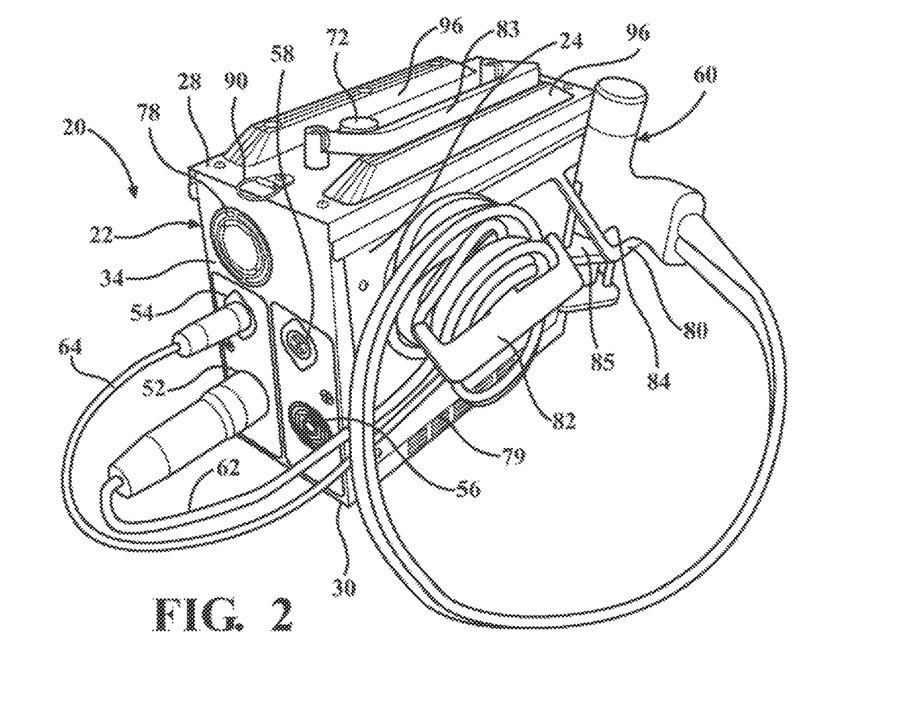
FIG. 2 is a perspective front view of the portable stud welder of FIG. 1.

As best illustrated in FIGS. 1-3, the controller 42 and the battery 38 are disposed in electrical connection with one another when the battery 38 is disposed in the recess 38. The controller 42 is configured to execute various operational, diagnostic and safety tasks. For example, the controller 42 is configured to discontinue welding when the battery 38 reaches a low charge level. This provides the operator notice (e.g., a visual or audible warning) when the battery 38 is low so they can take action before the battery voltage falls low enough such that the stud welder apparatus 20 might be at risk of malfunctioning, or completely shutting off.

Figure 6:
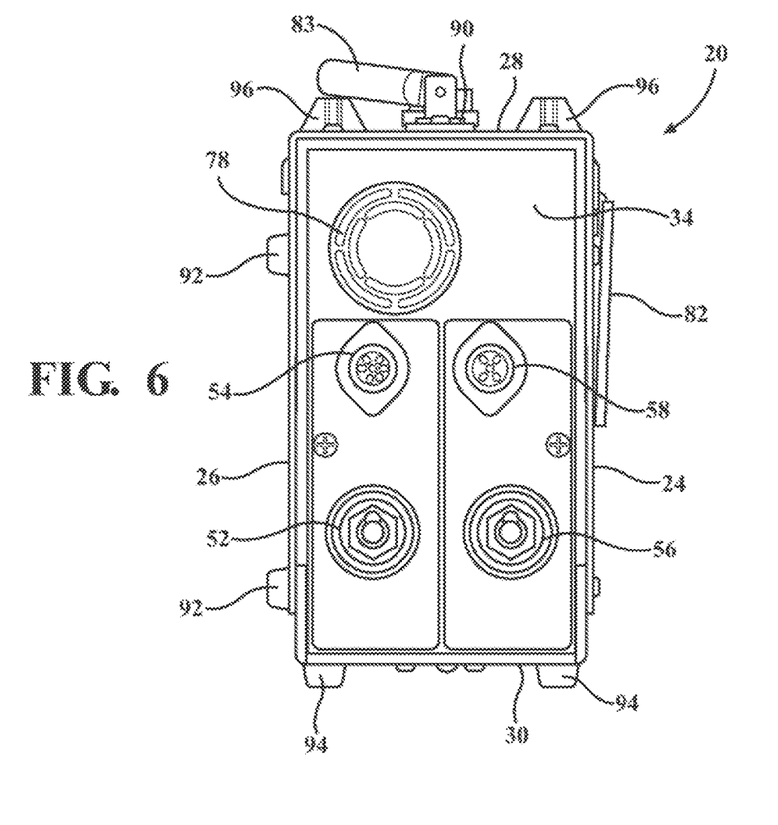
FIG. 6 is a second side view of the portable stud welder.
Figure 7:
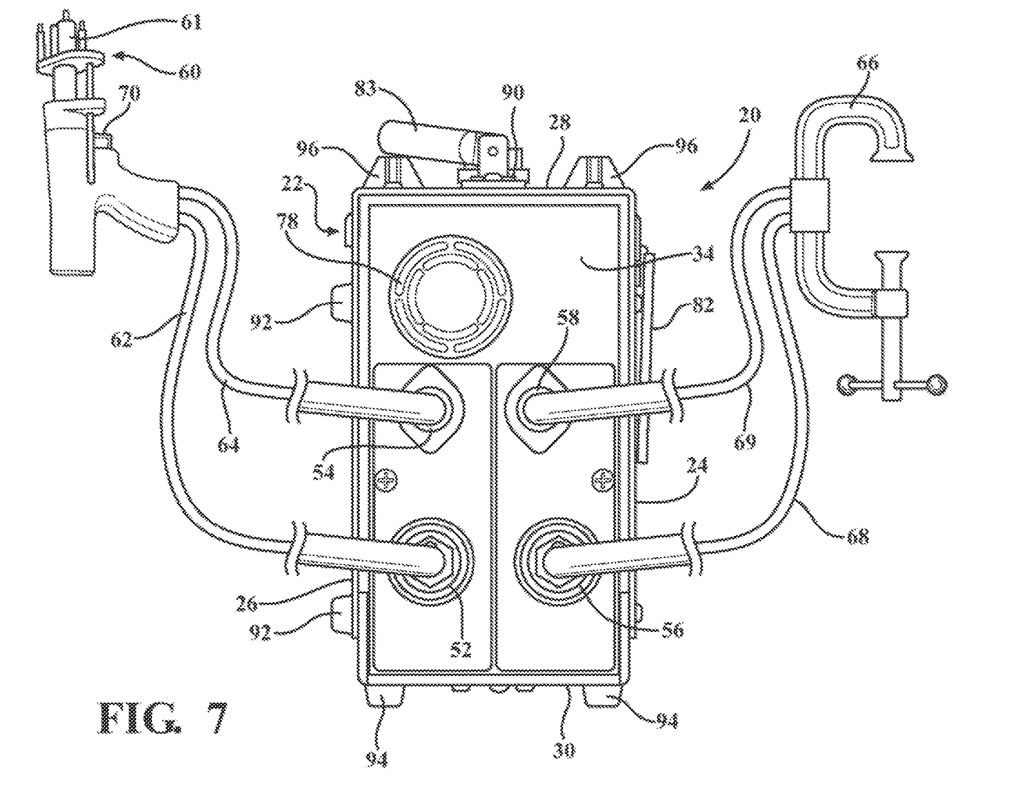
FIG. 7 is a second side view of the portable stud welder, illustrating a weld stud gun and connector connected thereto.

As best illustrated in FIG. 6, the front wall 34 of the housing 22 presents a gun welding terminal 52, a gun control terminal 54, a work piece ground terminal 56, and a chassis ground terminal 58. As best illustrated in FIGS. 1, 2 and 7A, a weld stud gun 60 of the capacitive discharge type is electrically connected to the energy storage device 36 via the gun welding terminal 52. It should be appreciated that various styles of capacitive discharge (CD) weld stud guns could be utilized with the subject stud welder apparatus 20. The weld stud gun 60 includes a collet 61 for being releasable attached to a stud or other fastener. It should be appreciated that the collet 61 and other components of the weld stud gun 60 are configured such that they may be used with various studs or other fasteners. For example, the subject stud welder apparatus 20 can be used to weld various weldable pins that meet requirements of American Welding Society (AWS) codes, and other international codes, for example, weld pins up to ¼" in diameter, and standard tip studs and cupped head pins. As best illustrated in FIG. 7, a weld cable 62 extends from the weld stud gun 60 to the gun welding terminal 52 to provide a welding voltage to the weld stud gun 60. Additionally, a two-wire control cable 64 extends from the weld stud gun 60 to the gun control terminal 54. The controller 42 provides instructions to the weld stud gun 60 through the control cable 64 for controlling the output of the weld stud gun 60.

As best illustrated in FIG. 7, a connector 66 is provided for connecting the portable stud welder 20 to the work piece. In a preferred arrangement, the connector 66 is a clamp 66 of an electrically conductive material. A welding ground cable 68 extends from the clamp 66 to the work piece ground terminal 56. Since the portable stud welder apparatus 20 can operate without a traditional line power cord, the usual means for providing a chassis safety ground connection are not present. Given this, the stud welder apparatus 20 includes a safety ground cable 69, i.e., a safety ground, which connects to the chassis ground terminal 58. The other end of the safety ground cable 69 is connected to the connector 66 in a durable fashion, such as a permanent crimp connection or the like, which the operator cannot accidentally defeat. The controller 42 checks the continuity of the safety ground cable 69 continuously, and is configured to generate an alert (e.g., visual or audio) to the operator if the controller 42 detects a missing connection of the safety ground cable 69.

The weld stud gun 60 includes a trigger 70 that is moveable between an activated position and a non-activated position. When disposed in the activated position, the trigger 70 sends a signal through the control cable 64 to the controller 42 which signals discharge circuit 40, thus applying a voltage to the weld cable 62 and weld stud gun 60, causing a welding arc to form and a welding current to flow, i.e., a current pulse, through the stud and work piece to the welding ground cable 68. The welding arc is created between the distal end of the stud and the attachment site on the work piece. The welding arc melts both the distal tip of the stud and creates a molten pool at the area of attachment on the work piece. The weld stud gun 60 then plunges the stud into the molten pool at the area of attachment, creating a weldment to the work piece. When the trigger 70 is disposed in the non-activated position, no welding voltage is applied to the weld stud gun 60.

Figure 5:
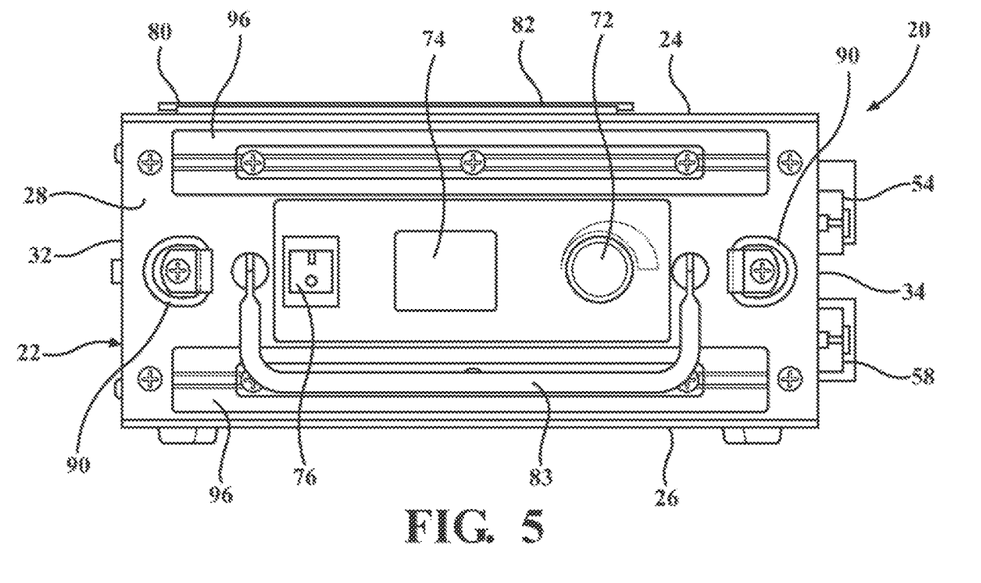
FIG. 5 is a top view of the portable stud welder.

As best illustrated in FIG. 5, a knob 72 is disposed on the top wall 28 of the housing 22 and is electrically connected to an encoder (not shown) for adjusting the voltage level of the capacitor 36. A display screen 74 is positioned on the top wall 28 of the housing 22 for presenting information to a user such as the voltage level of the capacitor 36 selected by the knob 72 and/or information or alerts generated by the controller 42 regarding the battery 38. An actuation switch 76 is positioned on the top wall 28 of the housing 22 and is moveable between an on position and an off position for powering on and off the stud welder apparatus 20. A plurality of vents 78, 79 are defined by the front wall 24, the back wall 26 and the side walls 32, 34 of the housing 22 for cooling the compartment of the housing 22. More specifically, an intake vent 78 is defined by the second side wall 34 for drawing air into the compartment. A fan (not shown) is disposed in the housing 22 in alignment with the intake fan 78. A thermal sensor (not shown) is also disposed in the housing 20 and is configured to activate the fan upon a detection that the internal temperature of the housing 22 has passed a predetermined temperature to cool the components in the housing 22. Furthermore, a plurality of the vents are exhaust vents 79 for removing air from the housing 22. As shown, the exhaust vents 79 may be positioned on the front wall 32, back wall 26 and front side wall 32.

Figure 9:
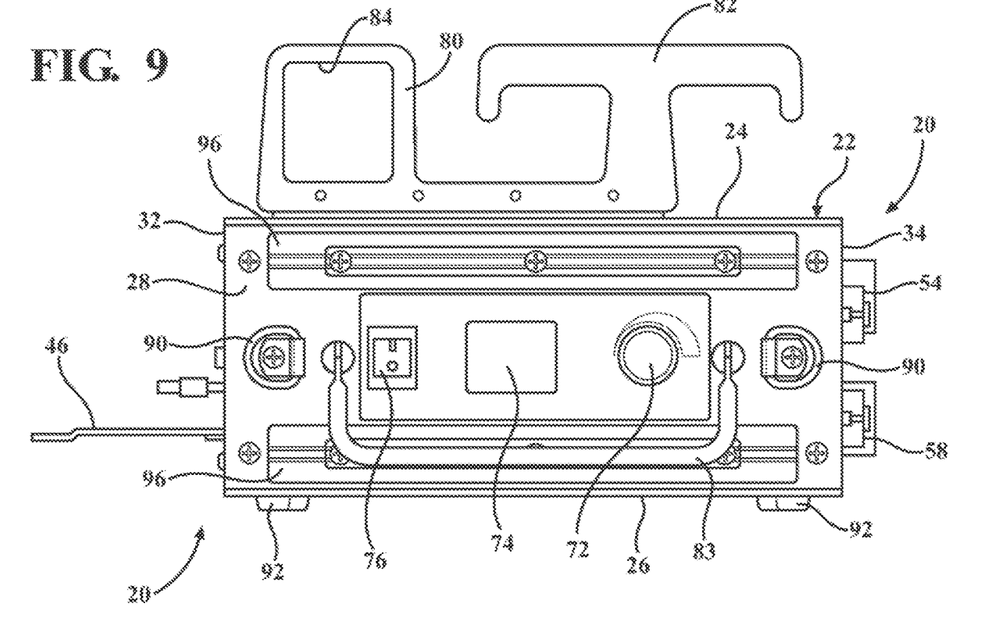
FIG. 9 is a top view of the portable stud welder, also illustrating the door disposed in an open position, and the support assembly disposed in an unfolded position.

As best illustrated in FIG. 9, a support assembly 80, 82 is pivotally connected to the front wall 24 of the housing 22 for supporting the weld stud gun 60 and its corresponding cables 62, 64, 68, 69. The support assembly 80, 82 provides a simple, lightweight cable management feature to the housing 22, which uses the weight of the weld stud gun 60 and cables 62, 64, 68, 69 to help trap these components securely against the housing 22. The support assembly 80, 82 is pivotable between a folded position and an unfolded position. In the folded position (as illustrated in FIGS. 4-7), the support assembly 80, 82 extends generally flush with the front wall 24 to save space and prevent sharp edges of the support assembly 80, 82 from injuring the operator. In the unfolded position (as illustrated in FIGS. 1, 2, 8 and 9), the support assembly 80, 82 extends at an angle relative to the front wall 24 such that the support assembly may receive the weld stud gun 60 and cables 62, 64, 68, 69. It should be appreciated that the support assembly 80, 82 may extend at various angles relative to the front wall 24 to adapt to differently sized cables and weld stud guns.

The support assembly 80, 82 includes a holster 80 that generally has a rectangular shaped opening 84 for receiving and holding the weld stud gun 60. The holster 80 is sized to allow a barrel portion 85 of the weld stud gun 60 to pass through the rectangular opening 84, and then relies on the weight of the weld stud gun 60 to bias the support assembly 80, 82 toward the folded position to trap the weld stud gun 60 against the holster 80. The support assembly 80, 82 also includes a cleat 82 that generally has a T-shape for allowing the cables 62, 64, 68, 69 to be wrapped thereabout. The cleat 82 is sized to allow an operator to coil and store the various cables 62, 64, 68, 69 on the cleat 82, and use the weight of the cables 62, 64, 68, 69 to bias the support assembly 80, 82 toward the folded position to trap the cables 62, 64, 68, 69 securely for transport. Although the holster 80 and cleat 82 are presented in the example embodiment as being integrally connected to one another, they could be unattached such that they may pivot independently of one another. It should be appreciated that the simple, compact design of the support assembly 80, 82 decreases the time it takes to set up or put away the subject welder apparatus 20, and provides a compact overall configuration of the stud welder apparatus 20.

As best illustrated in FIG. 1, a handle 83 is pivotally connected to the top wall 28 of the housing 22 for allowing a user to carry the housing 22. Further, a strap 88 is removably connected to the housing 22 for allowing a user to easily carry, transport, and support the portable stud welder 20. More specifically, a pair of connecting rings 90 are each positioned on opposing sides of the top wall 28 of the housing 22, and a pair of coupling links 91, which are each connected to an end of the strap 88, are removeably connected to one of the connecting rings 90. It should be appreciated that the shoulder strap 88 allows the operator to use the subject weld stud apparatus 20 while remaining mobile with his/her hands free. Put another way, if the welding operation does not allow the stud welder apparatus 20 to be placed on a support surface, but rather requires manual support by the user, such as if the user is working in a raised position on a ladder, the shoulder strap 88 allows the user to support the stud welder apparatus 20 on their body, leaving their hands-free to attend to the welding operation. It should also be appreciated that the strap 88 may have various lengths and widths, and is padded to provide increased comfort to an operator.

As best illustrated in FIG. 4, a plurality of back support legs 92 are disposed on the back wall 26 of the housing 22, and a plurality of bottom support legs 94 are disposed on the bottom wall 30 of the housing 22. The back support legs 92 and bottom support legs 94 allow the housing 22 to be positioned and used while in both a horizontal position on its back wall 26, or a vertical positon on its bottom wall 30, without damaging other components of the housing. Furthermore, a pair of rails 96 are disposed on the top wall 28 in spaced and parallel relationship with one another on opposing sides of the handle 83. The rails 96 limit the pivoting movement of the handle 83 and protect the display screen 74, knob 72 and actuation switch 76.

It should be appreciated that the overall light weight, compact configuration of the subject stud welder apparatus 20 provides increased safety while operators work off of ladders, lifts and platforms since they do not have to hold onto the subject stud welder apparatus 20. It should also be appreciated that the compact and light-weight components of the stud welder apparatus 20 facilitate a configuration with a relatively small form factor, for example, less than or equal to 1000 in$^3$ (0.58 ft$^3$), and less than or equal to twenty pounds (excluding the weld stud gun 60 and cables 62, 64, 68, 69), which allows the device to easily be transported by an operator by way of the handle 83 or shoulder strap 88 so that the portable stud welder apparatus 20 can also be carried by the worker while performing weld tasks.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A portable stud welder apparatus for welding a stud onto a work piece, said portable stud welder apparatus including:
   a housing;
   an energy storage device disposed in said housing;
   a weld stud gun electrically connected to said energy storage device for receiving energy from said energy storage device to pass a current through the stud and the work piece to form a weldment;
   at least one battery of the lithium ion type being removeably coupled to said housing to establish an electrical connection with said energy storage device to provide energy to said energy storage device;
   a battery charger independent of and separate from said housing for charging said at least one battery of the lithium ion type, wherein said housing does not include a power cord;
   said at least one battery of the lithium ion type including an internal battery management system;
   said housing defining a work piece ground terminal and a chassis ground terminal;
   a welding ground cable extending from said work piece ground terminal of said housing to a connector for being fixed and electrically connected to the work piece; and
   a safety ground cable separate from said welding ground cable and extending between said chassis ground terminal and said connector for providing a safety ground for the portable stud welder apparatus.

2. A portable stud welder apparatus as set forth in claim 1 wherein said housing defines a battery recess including a battery terminal electrically connected with said energy storage device; and said at least one battery is removably received by said battery recess to dispose said at least one battery in electrical contact with said battery terminal for securely storing said battery during use of said portable stud welder apparatus.

3. A portable stud welder apparatus as set forth in claim 2 further including a door connected to said housing adjacent to said battery recess and moveable between an open position and a closed position, wherein said door encloses said battery in said battery recess and isolates said battery from an environment of the portable stud welder apparatus when in said closed position, and wherein said door does not obstruct removal of said battery from said battery recess when said door is in said open position.

4. A portable stud welder apparatus as set forth in claim 1 further including a holster pivotally connected to said housing for receiving said weld stud gun, said holster being pivotal between a folded position and an unfolded position, wherein said holster is positioned flush with said housing when said holster is in said folded position, and wherein said holster extends at an angle relative to said housing when said holster is in said unfolded position.

5. A portable stud welder apparatus as set forth in claim 4 further including a cleat pivotally connected to said housing for receiving cables thereabout, said cleat being pivotal between a folded position and an unfolded position, wherein said cleat is positioned flush with said housing when said cleat is in said folded position, and wherein said cleat extends at an angle relative to said housing when said cleat is in said unfolded position.

6. A portable stud welder apparatus as set forth in claim 5 wherein said holster and said cleat are integrally connected to one another.

7. A portable stud welder apparatus as set forth in claim 1 wherein a strap is connected to said housing for allowing a user to carry and support the portable stud welder apparatus.

8. A portable stud welder apparatus as set forth in claim 7 further including a pair of connecting rings attached to said housing, and a pair of coupling links each fixed to said strap and removeably connected to one of said connecting rings for establishing a removeable connection between said strap and said housing.

9. A portable stud welder apparatus as set forth in claim 1 wherein said battery is a 46.8 volt, 5 amp-hour lithium ion battery.

10. A portable stud welder apparatus as set forth in claim 1 wherein said housing defines a gun welding terminal;
    said gun welding terminal and said work piece ground terminal are electrically connected to said energy storage device;
    a weld cable extends from said weld stud gun said gun welding terminal of said housing.

11. A portable stud welder apparatus as set forth in claim 1 further including a controller disposed in said housing and configured to monitor the connection between said chassis ground cable and said chassis ground terminal and to generate an alert in response to the detection that said chassis ground cable and said safety ground terminal are disconnected.

12. A portable stud welder apparatus as set forth in claim 1 further including:
    a knob disposed on said housing and electrically connected to an encoder for adjusting the weld voltage applied to said weld stud gun;
    a display screen disposed on said housing for presenting information to a user, wherein said information includes at least the weld voltage selected by said knob;

a handle pivotally connected to said housing for allowing a user to carry said housing; and a pair of rails disposed on said housing in spaced and parallel relationship with one another on opposing sides of said knob, display screen, and handle for limiting said pivoting movement of said handle and preventing said knob, display screen and handle from being damaged.

13. A portable stud welder apparatus as set forth in claim 1 wherein said housing has a cuboid shape and includes a front wall, a back wall, a top wall, a bottom wall, a first side wall and a second side wall; and a plurality of back support legs are disposed on said back wall of said housing and a plurality of bottom support legs are disposed on said bottom wall of said housing for allowing said housing to be supported by said back or bottom support legs without damaging other components of said housing.

\* \* \* \* \*